May 7, 1935.  E. F. WORTMANN  2,000,730
AUTOMATIC FREEZING AND DISPENSING APPARATUS
Filed May 9, 1933   3 Sheets-Sheet 3
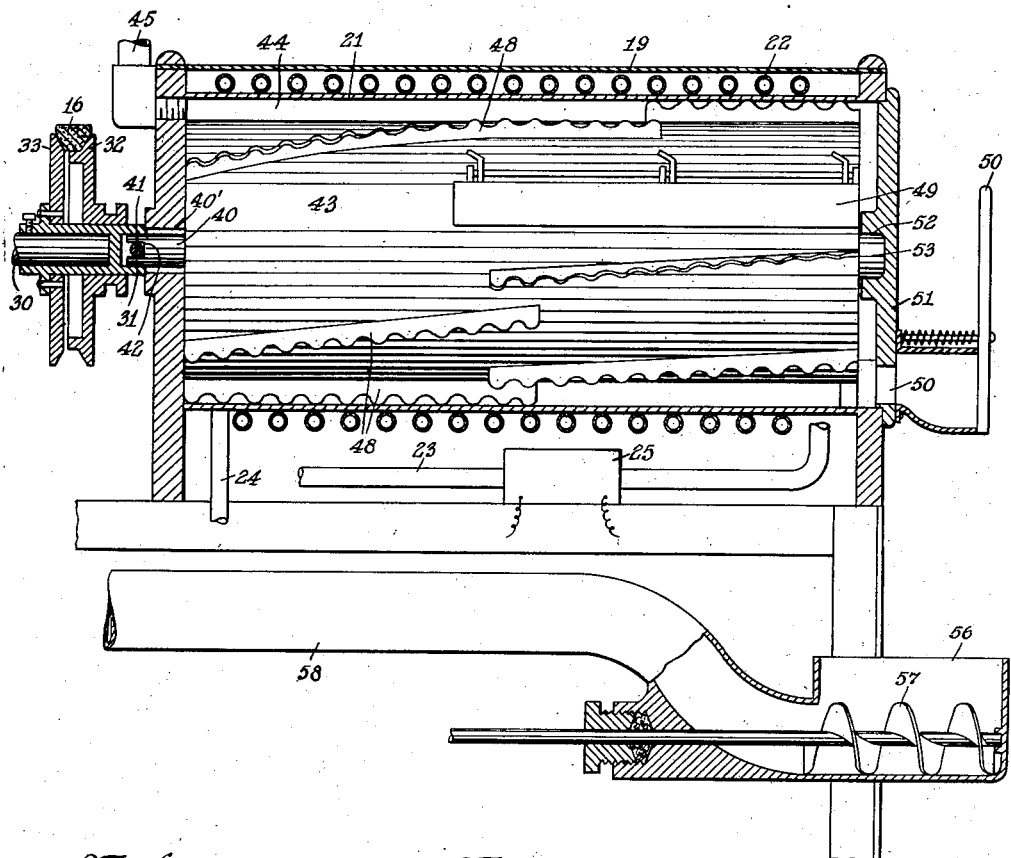
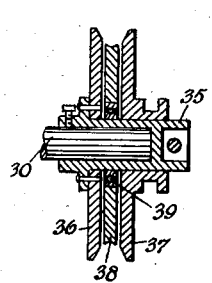
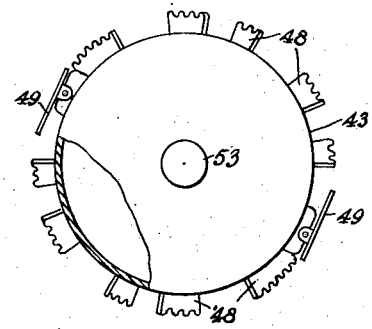
INVENTOR
EDWARD F. WORTMANN
BY
ATTORNEY Patented May 7, 1935

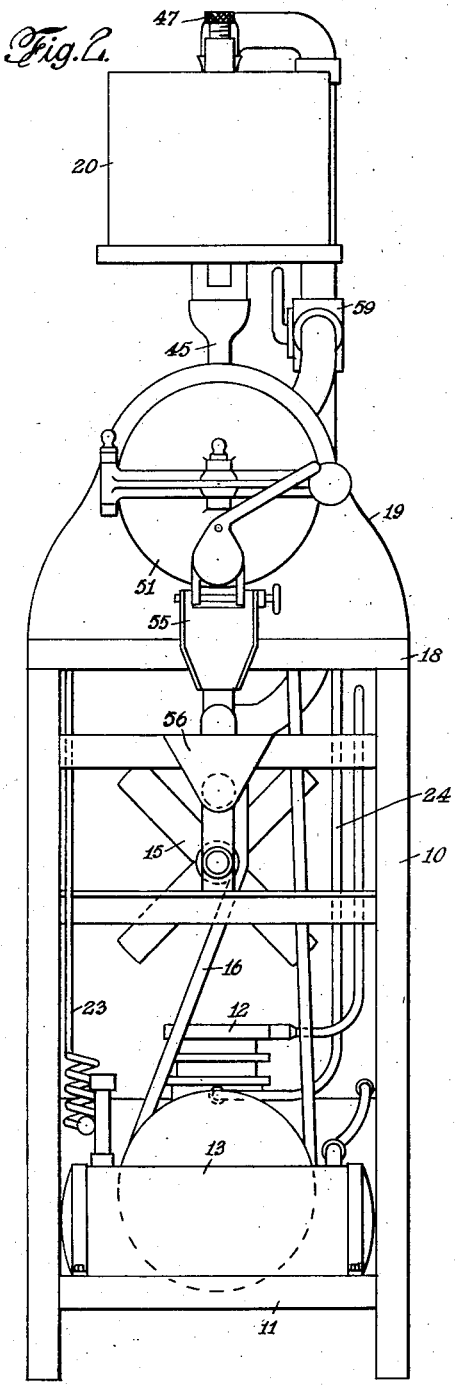
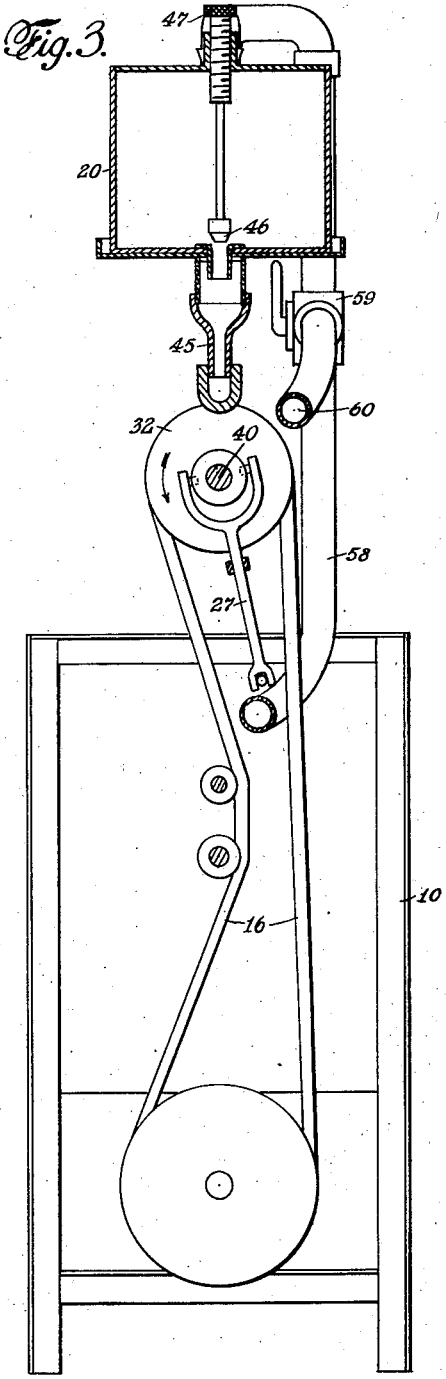

2,000,730

UNITED STATES PATENT OFFICE 2,000,730

AUTOMATIC FREEZING AND DISPENSING APPARATUS

Edward F. Wortmann, Jersey City, N. J.

Application May 9, 1933, Serial No. 670,115

5 Claims. (Cl. 62—114)

The invention relates to the freezing of edible liquid mixtures, such as ice cream, custards, etc., within, and the dispensing of the same from, apparatus constituting a self-contained unit.

The invention has for an object the provision of apparatus of this nature wherein not only may the actual freezing of the prepared mix be most expeditiously and efficiently performed and a continuous, rather than a batch, freezing accomplished, but wherein provision is also made against possibility of the mixer means freezing in and becoming injured upon subsequent resumption of operation.

Another object of the invention is to reduce the power consumption required, more especially with respect to the provision of a novel freezing unit.

A further object of the invention resides in the provision of a novel driving arrangement for the mixer and refrigerating element, and which will admit, furthermore, of ready withdrawal of the mixer portion of the apparatus for cleaning purposes.

Still another object of the invention is to provide for the alternative return of discharged product to a storage receptacle or to the freezing drum for retreatment of the mix.

In carrying out the invention, a suitable mix is arranged to be fed into a novel type of freezing drum, or rather, into the annular and cylindrical space provided therein as by rotatably mounting a hollow displacement cylinder within the drum, said cylinder bearing upon its periphery suitable beater and scraper elements for intimately mixing the liquid mix, in the said space between the periphery of said cylinder and the inner surface of the surrounding drum, and scraping adhering congealed mix from the latter surface.

A cooling coil is arranged about the exterior of the drum for suitably reducing the temperature within the latter to cause the mixture to congeal substantially instantaneously to the desired degree, and provision is made, furthermore, for withdrawing the more or less congealed mix from the opposite end of the drum, the same being directed thereto under the action of gravity as well as due to the action of the beater blades which are correspondingly pitched for this purpose. A continuous discharge of more or less frozen mix may thus be afforded.

In case it should be desired to return a portion or the whole of the discharged mix, rather than dispense the same for use, provision is made to divert the flow from the outlet of the drum to a pan or like receptacle; and in the pan may be mounted a screw conveyor for carrying back the more or less congealed mix, either to the drum or to the storage vessel for mix, a three-way valve being included in the return conduits for this purpose.

The rotatable cylinder aforesaid is directly but removably connected to and continuously driven by an electric motor or other suitable driving means so that at no time will the said cylinder with beater elements and scrapers be at rest and likely to be frozen in through the solidifying of the mix in the space about said cylinder. Moreover, the mounting of this cylinder is such that it may readily be removed as for cleaning.

Furthermore, said motor is arranged to operate, as required, suitable refrigerator apparatus for circulating a refrigerant about the drum containing said rotatable cylinder, the supply of refrigerant and operation of the refrigerator apparatus being automatically controlled as from a suitable thermostatic expansion valve located at the freezing drum. It will be appreciated, therefore, that while the cylinder is constantly being rotated, operation of the refrigerator apparatus is intermittent and only in accordance with the requirements of the freezing drum.

The nature of the invention, however, will best be understood when described in connection with the accompanying drawings, in which:

Fig. 2 is an end elevation thereof.

Fig. 3 is a vertical section, taken on the line 3—3, Fig. 1 of the drawings, and looking in the direction of the arrows.

Fig. 4 is an enlarged longitudinal section through the freezing drum, return duct and driving pulley.

Fig. 5 is an end view, partly in section, of the beater cylinder.

Fig. 6 is a fragmentary sectional view illustrating a modification in the power transmission means.

Figure 1:
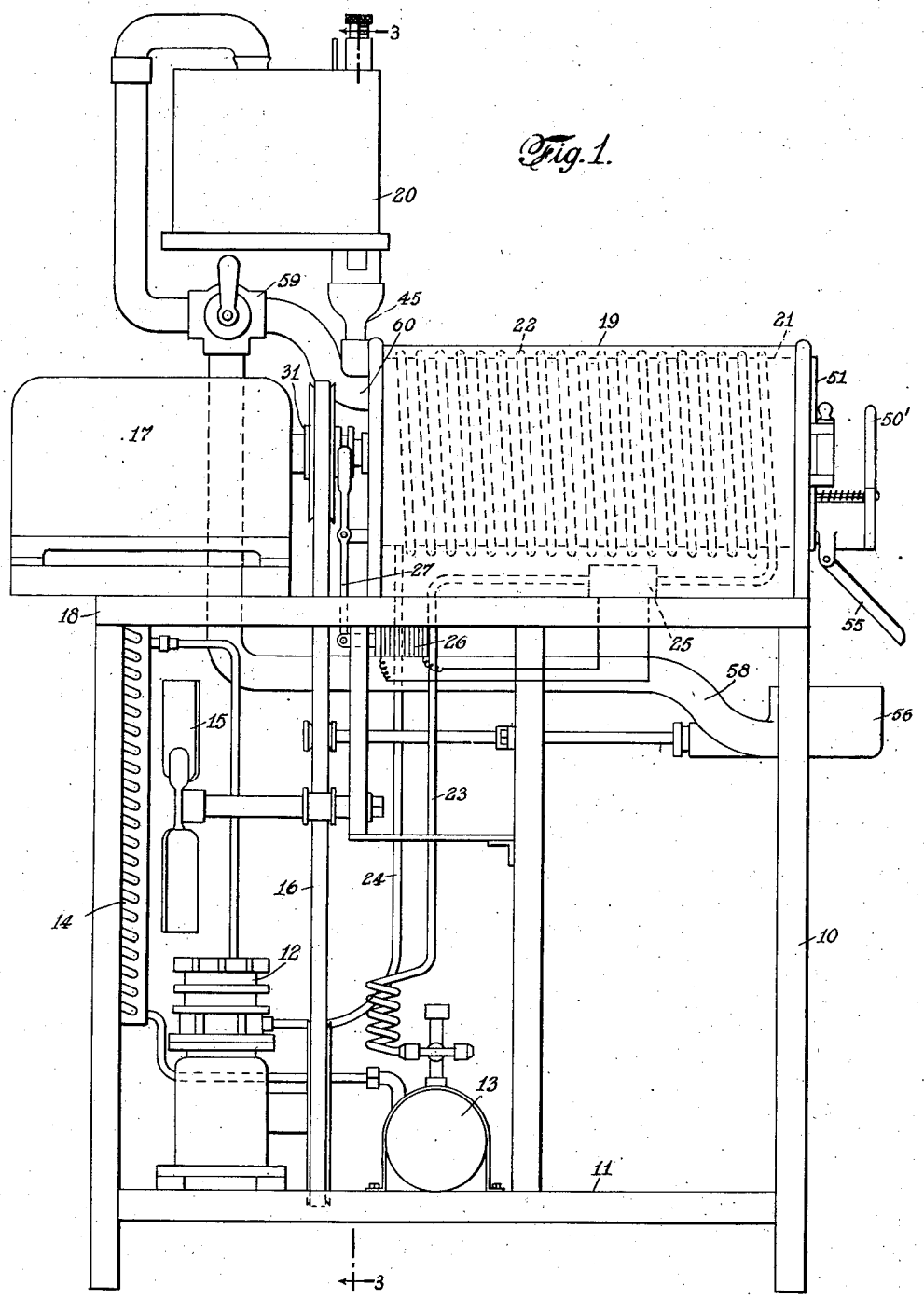
Fig. 1 shows the novel self-contained unit in side elevation.

Referring to the drawings, 10 designates a suitable frame having a lower shelf 11 upon which is mounted the refrigerator apparatus, represented generally by the compressor 12, receiver tank 13, and condenser 14 which is associated with a cooling fan 15. The latter, as well as the compressor, is driven through a belt 16 from an electric motor 17 suitably carried by a top plate 18 of the frame and upon which is mounted also the freezing unit for the mix and represented by the cover element 19, the mix being adapted to be fed in the manner hereinafter set forth into the freezing unit from a suitable storage or supply tank 20 for said mix.

The freezing unit is more particularly set forth in Fig. 4 of the drawings and comprises a cylindrical drum 21 mounted within the cover 19 and between which drum and the said cover is located a cooling helix or pipe coil 22. Refrigerant from the refrigerator apparatus is designed to be introduced to the coil through the inlet pipe 23 and discharged therefrom through the return pipe 24.

A thermostatic expansion valve indicated at 25 of any well known type is included in the inlet pipe 23; and, in addition to controlling the supply of refrigerant to the pipe coil 22 in manner well understood, also controls the operation of a solenoid 26. The latter, through the operation of a shift lever 27, is designed to control operation of the refrigerator apparatus, for example, through the transmission of power by belt 16. That is to say, when the freezing unit has attained a sufficiently low degree of temperature, not only will the expansion valve reduce or cut off entirely the supply of refrigerant thereto, but the refrigerator apparatus itself is temporarily placed out of action.

To this end, the shaft 30 of motor 17 may have secured thereto a sleeve 31 upon which is mounted to slide axially of the shaft the loose half 32 of a V-pulley whose coacting half 33 is secured to the said sleeve to rotate therewith. The belt 16 is in the nature of a V-shape belt fitting over the pulley halves; and when it is not desired to transmit power through the belt to the refrigerator apparatus, the loose or movable half 32 will be displaced axially away from the other half 33.

Or a modified transmission member may be provided, for example, as indicated in Fig. 6. In this expedient, there is secured to a sleeve 35 fixed to shaft 30 a V-pulley half 36; and, similarly, a slidable or loose half 37 is mounted upon the said sleeve. However, there is provided intermediate the said halves a free running disk or annular member 38 which may be mounted to this end upon an annular ball bearing member 39 of the sleeve. The belt may thus run freely upon the periphery of member 38 when the halves are separated so that no power will be transmitted until the halves are brought together to grip the belt as hereinbefore set forth.

To the shaft 30, moreover, is removably coupled a trunnion 40, as by means of a radially disposed pin 41 of said shaft fitting into a diametral slot 42 of the trunnion, said trunnion passing through an opening 40' of drum 21 and the shaft serving to carry or support thereby one end of a cylinder 43. This cylinder is preferably hollow, and is mounted coaxially within the drum 21 to afford an intermediate annular and cylindrical space 44. This cylinder, moreover, will be continuously rotated so long as motor 17 is operating so that if for any reason the cooling action of coil 22 be maintained or prolonged beyond the required period, no freezing in of the said cylinder will result. Cylinder 43 is in the nature of a displacement vessel designed to confine the mix to be frozen into the annular cylindrical space 44 between the periphery of cylinder 43 and the inner surface of drum 21 so that a large surface is exposed to the freezing action rather than a solid and distant bulk of mix. By this expedient, the mix is presented in a most effective manner for freezing, being in contact over a relatively large surface in proportion to its volume; and substantially instantaneous freezing may thus be effected.

The mix may conveniently be introduced from the tank 20 through a supply pipe 45, a valve 46 being provided in the bottom of the supply vessel 20 and controlled by the thumb-screw 47 located at the top. Suitable beater elements 48 are provided over the periphery of cylinder 43, as well as scrapers 49, the former being pitched slightly toward the outlet 50 of the drum, which may also be inclined slightly downwardly to insure discharge of the more or less congealed mix from the outlet 50 of the said drum. Furthermore, the axial thrust thus produced will automatically serve to seal the opening 40' through which trunnion 40 passes out of the drum at its opposite end.

A swinging door or other suitable closure member 51 is provided at the far end of the drum to seal the same at the discharge end, and is recessed axially as at 52 to receive a trunnion 53 of the cylinder and afford a bearing therefor. When this door is swung open, the entire cylinder may conveniently be withdrawn from the drum, the opposite end being readily detachable, as hereinbefore noted, and said cylinder thus rendered available for ready and convenient cleansing externally of the drum, the interior of which is thereby also similarly rendered conveniently accessible for cleaning purposes.

The frozen or more or less congealed mix is arranged to be delivered from the outlet 50 upon a deflector plate 55 when a lever 50' is operated, and from which it may be dispensed as desired. Or, the deflector plate may be swung out of the way (backwardly) so as to permit the mix, more or less congealed, to fall into a can or receptacle 56 in which is provided a screw conveyor 57 driven from the belt 16. This conveyor is designed to return the mix, through a duct 58, either to the storage receptacle 20 or back into the space 44, a three-way valve 59 being provided in duct 58 for this purpose and a connection 60 therefrom taken to the said space.

I claim:

1. In apparatus of the character set forth: a freezing drum, a displacement cylinder rotatably mounted within the same to provide an intermediate reduced annular and cylindrical mixing space, the periphery of said cylinder being provided with suitable beater and scraper elements longitudinally disposed thereon and displaced circumferentially thereover, means to introduce at one end of the mixing space a mix to be frozen, means to withdraw the congealed mix from an opposite end of the space, means to rotate said cylinder, and cooling means associated with the drum.

2. In apparatus of the character set forth: a freezing drum, a displacement cylinder rotatably mounted within the same to provide an intermediate reduced annular and cylindrical mixing space, the periphery of said cylinder being provided with suitable beater elements, means to introduce at one end of the mixing space a mix to be frozen, means to withdraw the congealed mix from an opposite end of the space, a motor directly connected to said cylinder to rotate the same, refrigerator apparatus, a cooling coil surrounding the drum and connected with said refrigerator apparatus, and means to automatically connect the motor with the refrigerator apparatus for circulating refrigerant through the said coil and in accordance with the thermic requirements of the refrigerator apparatus.

3. In apparatus of the character set forth: a freezing drum, a displacement cylinder rotatably mounted within the same to provide an intermediate reduced annular and cylindrical mixing space, the periphery of said cylinder being provided with suitable beater elements, means to introduce at one end of the mixing space a mix to be frozen, means to withdraw the congealed mix from an opposite end of the space, a motor directly connected to said cylinder to rotate the same, refrigerator apparatus, a cooling coil surrounding the drum and connected with said refrigerator apparatus, and a thermostatic expansion valve to automatically connect the motor with the refrigerator apparatus for circulating refrigerant through the said coil.

4. In apparatus of the character set forth: a freezing drum, a displacement cylinder rotatably mounted within the same to provide an intermediate reduced annular and cylindrical mixing space, the periphery of said cylinder being provided with suitable beater elements, means to introduce at one end of the mixing space a mix to be frozen, means to withdraw the congealed mix from an opposite end of the space, means to rotate said cylinder, means to receive the discharged mix, and means to mechanically remove the discharged mix from the receiving means.

5. In apparatus of the character set forth: a freezing drum, a displacement cylinder rotatably mounted within the same to provide an intermediate reduced annular and cylindrical mixing space, the periphery of said cylinder being provided with suitable beater elements, means to introduce at one end of the mixing space a mix to be frozen, means to withdraw the congealed mix from an opposite end of the space, means to rotate said cylinder, means to receive the discharged mix, and means to return the same mechanically to the said intermediate space.

EDWARD F. WORTMANN.